No. 755,014. PATENTED MAR. 22, 1904.
H. E. KIRSTEIN.
EYEGLASSES.
APPLICATION FILED OCT. 6, 1902.
NO MODEL.
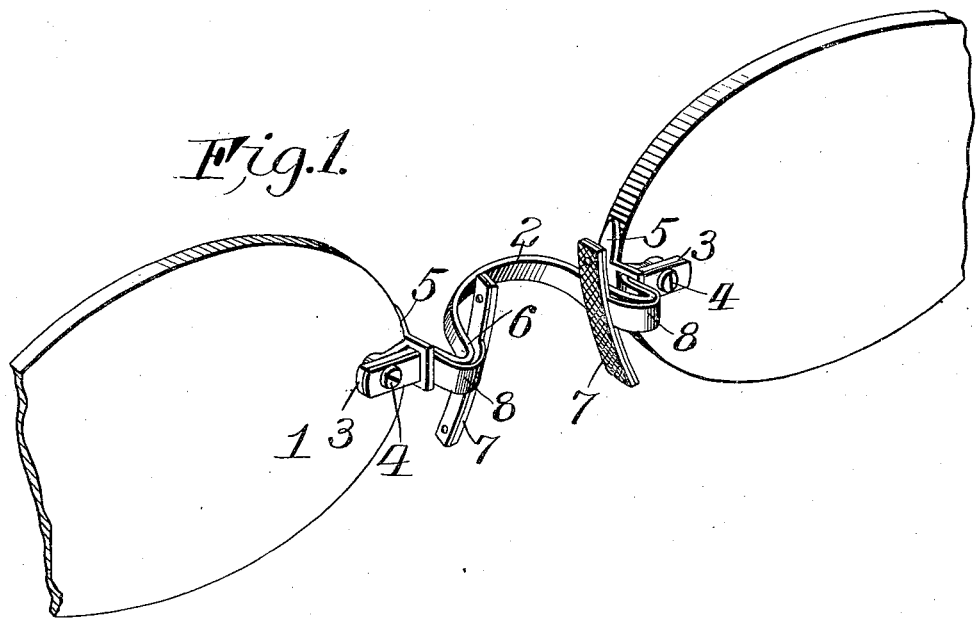
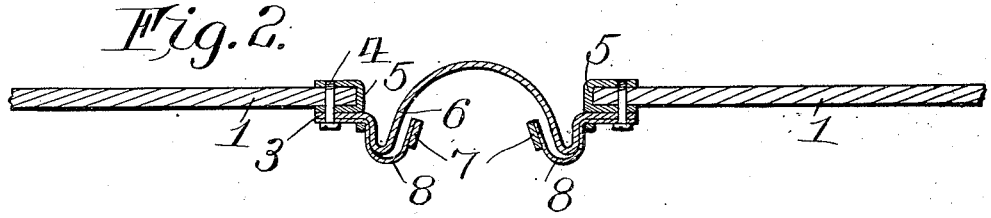
Witnesses
Walter B. Payne
G. Willard Rich
Inventor
Henry E. Kirstein
Frederick F. Church
his Attorney
THE NORRIS PETERS CO., PHOTO-LITHO., WASHINGTON, D. C.

No. 755,014. Patented March 22, 1904.

UNITED STATES PATENT OFFICE.

HENRY E. KIRSTEIN, OF ROCHESTER, NEW YORK.

EYEGLASSES.

SPECIFICATION forming part of Letters Patent No. 755,014, dated March 22, 1904.

Application filed October 6, 1902. Serial No. 126,008. (No model.)

*To all whom it may concern:*

Be it known that I, HENRY E. KIRSTEIN, of Rochester, in the county of Monroe and State of New York, have invented certain new and useful Improvements in Eyeglasses; and I do hereby declare the following to be a full and clear description of the same, reference being had to the accompanying drawings, forming a part of this specification, and to the reference-numerals marked thereon.

My present invention has for its object to provide an improved mounting or frame for eyeglasses and one which embodies a novel arrangement of the nose-guards, which are adapted to firmly engage the wearer's nose and are so attached to the frame that the length of the bow-spring or bridge is increased without detracting from its appearance to afford additional elasticity in the spring, as well as to provide sufficient material, whereby a frame may be capable of a wide range of adjustment when being fitted by an optician.

To these and other ends the invention consists in certain improvements in construction and combinations of parts, all as will be hereinafter more fully described, the novel features being pointed out in the claims at the end of the specification.

In the drawings, Figure 1 is a perspective view of a pair of eyeglasses, illustrating a frame or mounting constructed in accordance with my invention. Fig. 2 is a longitudinal sectional view thereof.

Similar reference-numerals in both figures indicate similar parts.

Eyeglasses constructed in accordance with my invention embody the lenses 1, and the latter are connected by means of the saddle or band-spring 2, forming the bridge-piece and preferably arranged with the central portion at an angle to the plane of the lenses and having the laterally-extending perforated ends 3, adapted to be secured to the lenses by suitable devices, which in the present instance are shown as screws or rivets 4, passing through the lens-clips 5. The ends of the spring adjacent the proximate edges of the lenses are preferably provided with U-shaped portions or loops 6, which lie on opposite sides of the wearer's nose, forming the rearwardly-extending sides, which afford sufficient length in the spring to provide considerable elasticity therein and at the same time providing means whereby the tension of the spring may be adjusted and the distance between the center of the lenses altered to obtain the correct pupilary distance. The guards 7, which bear upon opposite sides of the wearer's nose, are located between the arch or center of the spring or bridge-piece 2 and the ends of the side portions, and they are supported upon arms 8, curved in the present instance and preferably of spring material, so that the guards lie in opposition to each other and within the bow-spring or curve of the bridge-piece, said arms being detachable, so that different forms of guards may be employed, if desired.

I do not desire to be confined to the exact construction of the parts illustrated, as various modifications of the device will be suggested to those skilled in the art without departing from the spirit of my invention.

The means of supporting nose-guards which I have shown and described is simple and permits any of the various shapes and sizes thereof being employed, and by locating them between the top and the loops near the ends of the spring I am enabled to arrange the latter so that it may be formed to lie very close to the wearer's nose as it curves over the bridge thereof and still be of sufficient length to afford considerable elasticity, whereby the glasses may be easily applied and when so applied securely held in position.

While I have described the guards as applied entirely to eyeglasses, it will of course be readily seen that they may be used with equal efficiency upon spectacles, the arms upon which they are supported, if of elastic material, allowing the guards to give in planes parallel with the lenses as well as those at right angles thereto.

I claim as my invention—

1. In eyeglasses, the combination with the lenses and the bridge-spring having the substantially horizontally-extending loops arranged in rear of the lenses and between the center and the point of attachment to the lenses, of the yielding guard-arms secured to the lenses at one end and having the bearing-pads at the other, said pads being located between the rear ends of the loops in the bridge and the central portion thereof.

2. In eyeglasses, the combination with the lenses and the bridge-spring having the substantially horizontally-extending loops arranged in rear of the lenses and between the center and point of attachment to the lenses, of the yielding guard-arms attached to the lenses at one end, thence extending in rear of the loops and forwardly and having the bearing-pads at the free ends arranged between the rear ends of the loops of the bridge-spring and the forward portion of said spring.

HENRY E. KIRSTEIN.

Witnesses:
F. F. CHURCH,
ELIZABETH J. PERRY.